United States Patent
Hunck et al.

[11] B 3,987,768
[45] Oct. 26, 1976

[54] VEHICLE AUXILIARY HYDROSTATIC DRIVE SYSTEM

[75] Inventors: Billie Gene Hunck; James Henry Kress, both of Cedar Falls, Iowa

[73] Assignee: Deere & Company, Moline, Ill.

[22] Filed: Jan. 14, 1974

[21] Appl. No.: 433,094

[44] Published under the second Trial Voluntary Protest Program on January 27, 1976 as document No. B 433,094.

[52] U.S. Cl. .............................. 180/49; 180/44 M; 180/66 R; 60/465; 60/493
[51] Int. Cl.² ........................................ B60K 17/30
[58] Field of Search ............ 180/44 M, 44 F, 44 R, 180/66 R, 49; 60/493, 465, 466, 487

[56] References Cited
UNITED STATES PATENTS

| | | | |
|---|---|---|---|
| 3,129,781 | 4/1964 | Stein | 180/44 F |
| 3,458,005 | 7/1969 | Malm et al. | 180/60 |
| 3,473,442 | 10/1969 | Farmer et al. | 60/494 |
| 3,506,081 | 4/1970 | Rumsey | 180/44 F |
| 3,511,131 | 5/1970 | Kress | 91/176 |
| 3,640,066 | 2/1972 | Marshall | 60/466 |
| 3,641,765 | 2/1972 | Hancock | 180/44 F |
| 3,672,167 | 6/1972 | Griesenbrock | 180/66 R |
| 3,811,525 | 5/1974 | Stuart | 180/66 R |

*Primary Examiner*—M. H. Wood, Jr.
*Assistant Examiner*—John P. Silverstrim

[57] ABSTRACT

An auxiliary hydrostatic drive system for a vehicle includes a pump, a reservoir, fluid motors connected to the normally non-driven steerable wheels of the vehicle, reciprocating piston-type wheel drive motors connected to the normally nondriven steerable wheels, fluid lines interconnecting the pump and reservoir with the inlet and outlet ports of the wheel motors, and a motor control valve movable to either side of a neutral fluid blocking position to forward and reverse drive positions. An additional valve interconnects the motor ports with the drive chambers of the motors whenever the motor control valve is in the neutral position so that during periods when the motors are not connected to the pump and are driven mechanically, they function as pumps to pressurize their drive chambers and hold their pistons off the drive cams.

4 Claims, 3 Drawing Figures

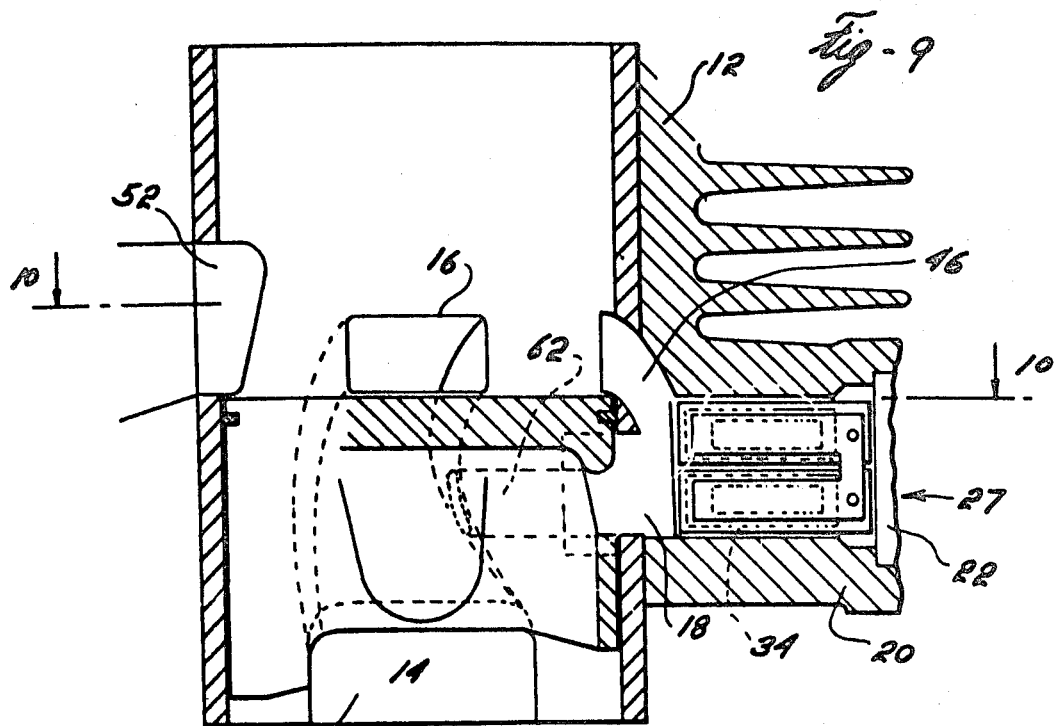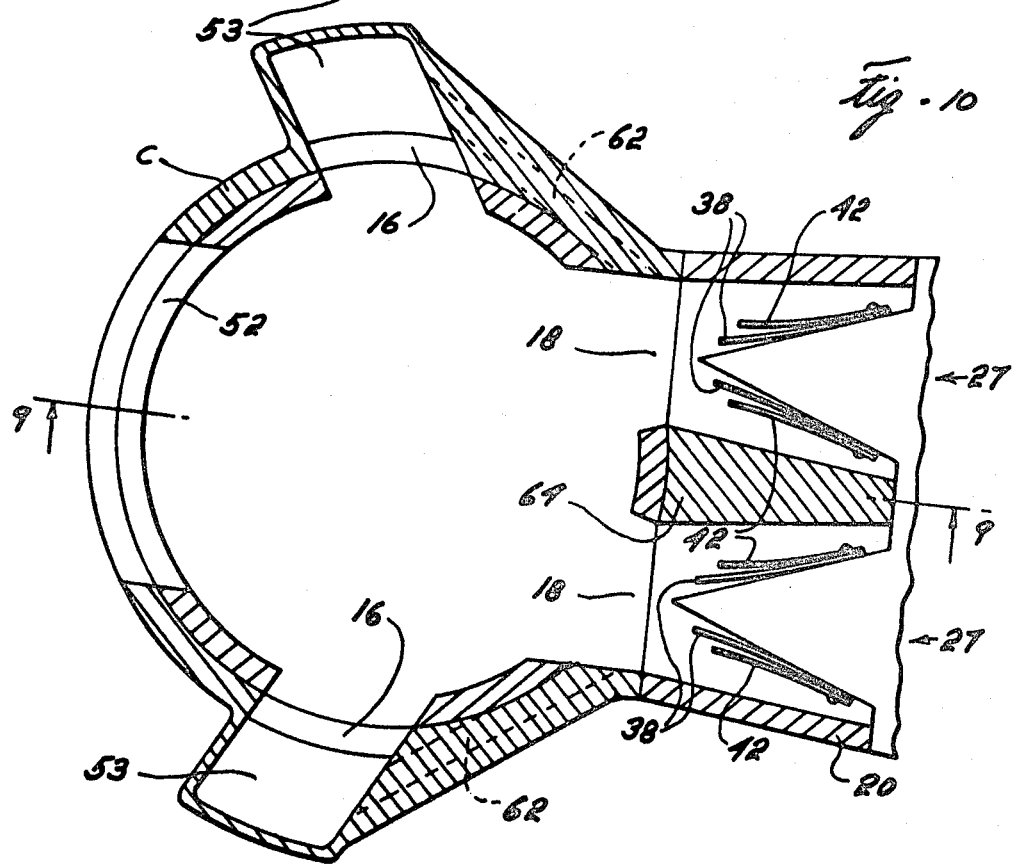

VEHICLE AUXILIARY HYDROSTATIC DRIVE SYSTEM

BACKGROUND OF THE INVENTION

The present invention relates generally to the art of hydraulics, particularly hydrostatic wheel drive systems, and more particularly relates to an improved auxiliary hydrostatic drive system in which the motors are automatically destroked whenever the auxiliary hydrostatic drive system is in a neutral condition and the motors are driven mechanically by the wheels.

In order to obtain additional traction, many agricultural and industrial tractors and similar vehicles are provided with an auxiliary hydrostatic drive for the normally nondriven steerable wheels. An example of such an auxiliary hydrostatic drive system is disclosed and claimed in U.S. Pat. No. 3,458,005 which issued on July 29, 1969 to D. I. Malm et al. Such auxiliary hydrostatic drive systems are generally employed only during periods when the load on the vehicle is great and the vehicle is moving at a relatively slow speed. During periods when the vehicle is moving at a relatively high speed, the motor is disconnected from the source of fluid pressure and, during these periods, some precaution must be taken or the high speeds at which the motors are driven can cause damage to the pistons and/or cam. In previous auxiliary hydrostatic drive systems, damage has been prevented during periods of nonuse through the use of pressure responsive clutches or through the use of variable displacement motors of the swashplate-type in which the swash plate can be returned to the neutral position. Proposals have also been made to pressurize the drive chambers of the motors from some external source so that the pistons are held off the cam.

SUMMARY OF THE INVENTION

The principal object of the present invention is to provide an improved auxiliary hydrostatic drive system in which the motors, when forced to rotate in either a forward or reverse direction while disconnected from the source of fluid pressure, will act as pumps to pressurize their own drive chambers to push the pistons far enough into their cylinders to avoid damaging contact with the cam or other drive member.

Another important object of the present invention is to provide an improved auxiliary hydrostatic wheel drive system in which the ports of the wheel drive motors are automatically connected to the drive chambers of the motors whenever the motors are disconnected from the high pressure source of fluid so that if the wheels are driven mechanically in either a forward or reverse direction, they operate as pumps to pressurize their own drive chambers to push their pistons into the cylinders and thereby prevent damaging contact between the pistons and cam or drive member.

The above objects and additional objects and advantages of the present invention will become apparent to those skilled in the art from a reading of the following detailed description when taken in conjunction with the accompanying drawings.

DESCRIPTION OF THE PREFERRED EMBODIMENTS

Figure 1:
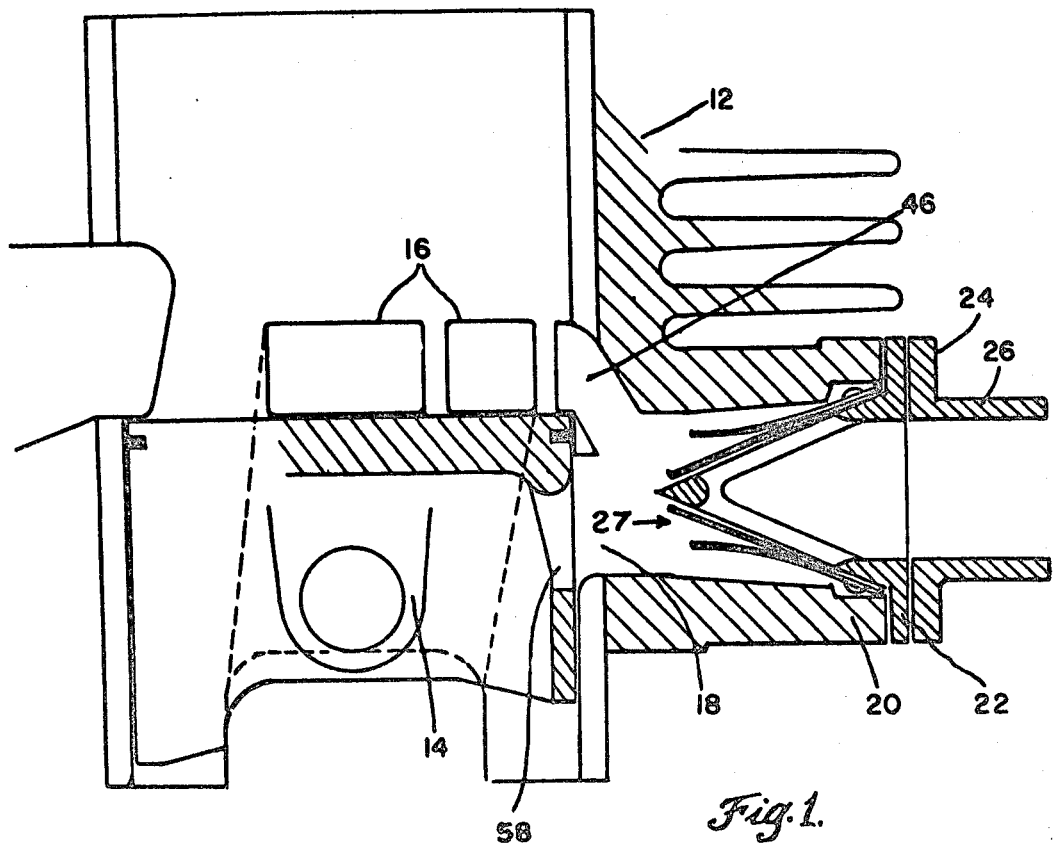
FIG. 1 is a side elevation view of a vehicle of the type in which the auxiliary hydrostatic drive system according to the present invention can be employed.

Referring to the drawings, a typical agricultural tractor is illustrated in FIG. 1 and includes a chassis 10 mounted on a pair of rear main traction wheels 12 and a pair of forward steerable wheels 14. The tractor includes an engine 16 connected to the rear traction wheels 12 through a conventional variable ratio mechanical transmission 18. The tractor also includes a pair of reversible hydraulic motors 20, each of which has one part fixed to the tractor chassis and a rotatable part drivingly connected to one of the steerable wheels 14. The motors 20 can be either the type having a fixed housing and rotatable shaft or of the type having a fixed shaft and rotatable housing, and the rotatable member of the motors 20 can be connected directly to the wheels 14 or indirectly through suitable gearing.

The motors 20 are of the type having a plurality of reciprocating pistons projecting into a drive chamber for engagement with a drive member which may take the form of a cam or fixed swash plate. The motors 20 can be either of the radial-piston-type such as shown in U.S. Pat. No. 3,283,668 which issued on Nov. 8, 1966 to A. I. Louhio and U.S. Pat. No. 3,511,131 which issued on May 12, 1970 to J. H. Kress, or of the axial-piston-type as generally illustrated in U.S. Pat. No. 3,691,910 which issued Sept. 19, 1972 to E. Reichel et al.

Figure 2:
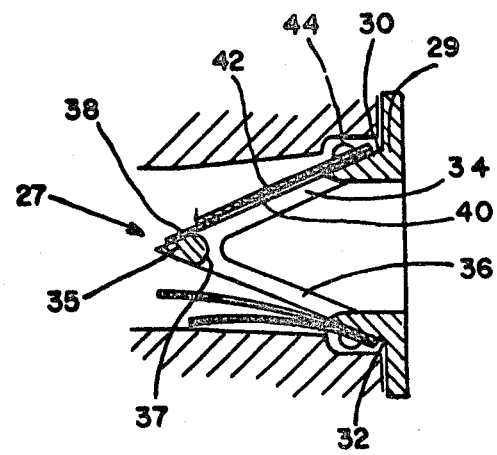
FIG. 2 is a schematic illustration of the hydrostatic drive system according to the present invention.
Figure 26:
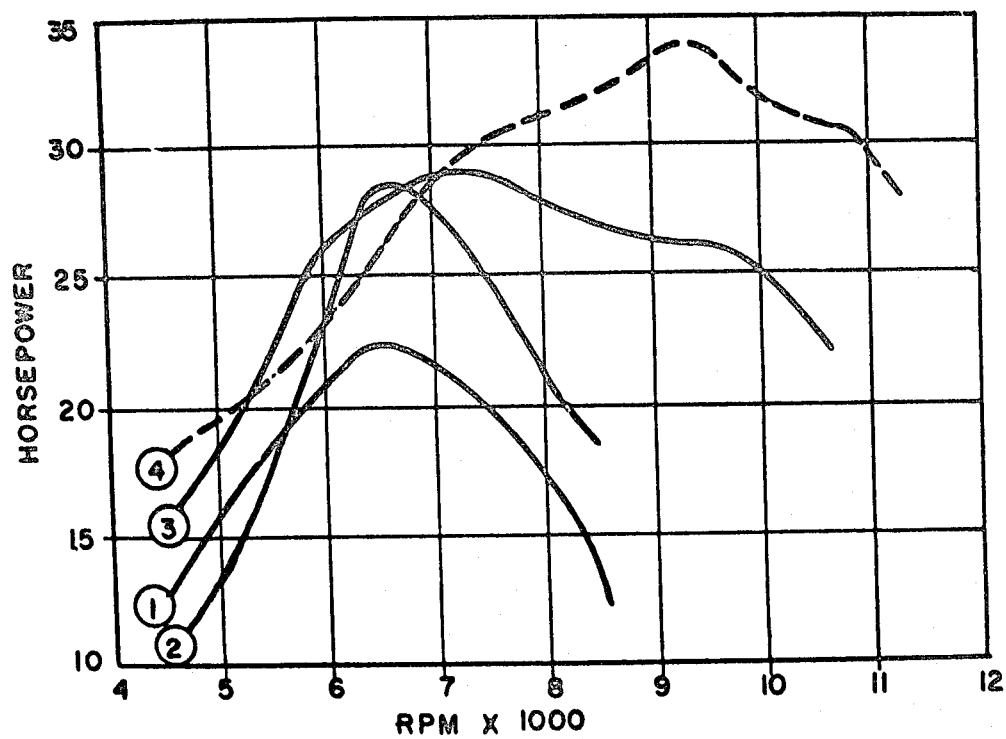

A schematic illustration of the overall auxiliary hydrostatic drive system is shown in FIG. 2 and includes a main variable displacement hydraulic pump 22, a reservoir 24 providing a supply of fluid for the pump 22, a charge pump 26 which delivers fluid from the reservoir 24 to the main pump 22 through a filter 28 which is connected between the pumps 26 and 22 by fluid lines 30 and 32. The filter 28 is protected by a relief valve 34 which connects the charge pump 26 with the reservoir 24 if the pressure drop across the filter 28 becomes excessive. The output of the pump 22 is connected by a fluid line 36 to one port in a first side of a spring-centered, pilot-operated, three-position, four-way motor control valve 38. A second port in the first side of the motor control valve 38 is connected to the reservoir 24 by a fluid line 40, an oil coder 42, and a fluid line 44. A restrictor 46 in the fluid line 44 maintains a slight amount of back pressure in the fluid lines 40 and 44. Fluid lines 48 and 50 are connected to the fluid lines 36 and 40 to serve as the supply and exhause lines for hydraulic functions such as hydraulic steering and hydraulic brakes (not shown). Since functions such as steering and brakes are critical, these functions will take priority over others and to this end a priority valve 52 is interposed in the fluid line 36 between the motor control valve 38 and fluid line 48 so that fluid cannot be delivered to the motor control valve 38 unless a predetermined minimum pressure is maintained in the fluid line 48.

A first port in the second side of the motor control valve 38 is connected to a first port in a wheel drive motor 20L by a fluid line 54, and the fluid line 54 is connected by a fluid line 56 to a first port in the first side of a pilot-operated parallel-series valve or a high-torque low-speed, low-torque high-speed valve 58. An additional fluid line 60 extends between a second port in the second side of the motor control valve 38 and a second port in the first side of the parallel-series valve 58, and the fluid line 60 is also connected to a second port in a wheel motor 20R by a fluid line 62. A first port in the second side of the parallel-series valve 58 is connected to a first port in the wheel motor 20R by a fluid line 64 and a second port in the second side of the parallel-series valve is connected to a second port in the motor 20L by a fluid line 66. When valve 58 is in the position illustrated, it connects the wheel motors 20 in parallel relationship with each other, and when the valve 58 is shifted to its alternate position, it connects the motors 20 in series relationship with each other.

The drive chambers or crankcase of the wheel motors 20 are fluid-tight except for connections with fluid lines 68 and 70. The fluid line 68 is connected to the fluid line 70 which in turn is connected to a port one side of a spring-centered, pilot-operated, three-position, three-way crankcase control valve 72. One port on the second side of the crankcase control valve 72 is connected by a fluid line 74 to a fluid line 76 which extends between the fluid lines 54 and 60. A pair of check valves 78 are interposed in the fluid line 76 to prevent the flow of fluid from the fluid lines 74 and 76 to the fluid lines 54 and 60. A second port on the second side of the valve 72 is connected by a fluid line 80 to a fluid line 82 which extends between the fluid lines 54 and 60. A pair of check valves 84 are interposed in the fluid line 82 to prevent flow of fluid from the fluid lines 54 and 60 to the fluid lines 82 and 80. The fluid line 80 is also connected to the reservoir 24 through a fluid line 86.

The pilot system for operation of the valves 38, 58 and 72 includes a forward solenoid valve 88, a reverse solenoid valve 90 and a parallel-series solenoid valve 92. Each of the solenoid valves is a two-position, three-way valve. One port in the first side of the valve 88 is connected to the fluid line 36 by a pilot line 94 and a second port in the first side of the valve 88 is connected to the fluid line 40 by pilot lines 96 and 98. A port in the second side of the valve 88 is connected to one end of the motor control valve 38 by a pilot line 100 and the pilot line 100 is also connected to one end of the valve 72 by a pilot line 102.

One port in the first side of the valve 90 is connected to the fluid line 36 by the pilot line 94, a pilot line 104 and a pilot line 106, and a second port in the first side of the valve 90 is connected to the fluid line 40 by the pilot line 98 and a pilot line 108. A port in the second side of the valve 90 is connected to the second end of the motor control valve 38 by a fluid line 110 which is also connected to the second end of the valve 72 by a pilot line 112.

One port in the first side of the valve 92 is connected to the fluid line 36 by the pilot lines 94 and 104 and a second port in the first side of the valve 92 is connected to the fluid line 40 by the pilot line 98. A port in the second side of the valve 92 is connected to one end of the parallel-series valve 58 by a pilot line 114.

The operation of the above-described auxiliary hydrostatic drive system is as follows. With the tractor engine 16 running, the pump 26 will supply fluid at a relatively low pressure to the main pump 22 which in turn will supply fluid under a relatively high pressure to the motor control valve 38 as long as the demands of the priority hydraulic functions connected to the line 48 are satisfied. Fluid delivered to the pump 22 by the pump 26 which is not needed to supply the demands of either the priority functions or the auxiliary hydrostatic drive system is returned to the reservoir 24 through a fluid line 116, the fluid line 40, the oil cooler 42, and the fluid line 44.

If the tractor is being driven in a forward direction, the solenoid for the valve 88 is actuated so it moves to the left and fluid pressure in the pilot line 94 will flow through the valve 88 and pilot line 100 and act on the valve 38 to move it to the left. With the valve 38 moved to the left, high pressure fluid will flow through the motor control valve 38 and fluid lines 54, 56, and 64 to the first ports of the wheel motors 20 to drive these motors in a forward direction. Low pressure fluid will exhaust from the second ports of the wheel motors 20 through fluid lines 66, 62, and 60 and the motor control valve 38 to the fluid line 40 back to the reservoir 24 through the cooler 42. If the tractor is being driven at a low speed, the parallel mode of the valve 58 may be selected so that the motors 20 will provide a high torque and low speed. If traction limits use of the high torque mode, then the then the low torque mode may be selected. If the variable ratio mechanical transmission 18 is in an intermediate speed or traction prohibits use of high torque, the series mode of the valve 58 will be selected by activating the solenoid of the solenoid valve 92 so that fluid pressure will flow through the fluid lines 94, 104 and 114 to act on the valve 58 and move it to the left. It should be noted that when the valve 38 was moved to the left, the valve 72 was also moved to the left since the pilot lines 100 and 102 provide an operative connection between these two valves to cause them to move substantially in unison. When the valve 72 was moved to the left, the drive chambers of the wheel motors 20 were connected to the reservoir 24 through the fluid lines 68, 70, and 86 while the fluid line 74 was blocked so that the high pressure within the fluid line 54 could not escape through the fluid line 74.

If the tractor is to operate in reverse, the solenoid for the valve 88 is deactivated so that the valve 88 moves to the right and the fluid pressure within the pilot lines 100 and 102 is exhausted through the pilot lines 96 and 98 to the fluid line 40. Simultaneously, or at a later time, the solenoid for the valve 90 will be activated so that this valve moves to the left and permits fluid pressure to flow through the pilot lines 94, 104, 106, 110, and 112 to act on the valves 38 and 72 and move them to the right. With the valve 38 moved to the right, high pressure fluid is delivered to the second ports of the wheel motors 20 and low pressure exhausted through the first ports so that the wheel motors 20 are driven in a reverse direction. The valve 72 functions in the same manner when moved to the right as it does when moved to the left.

To cut out the auxiliary hydrostatic drive system, the solenoids for the valves 88 and 90 are both deactivated so that fluid is exhausted from both ends of both of the pilot-operated, spring-centered valves 38 and 72 and these valves move to their neutral positions. When in the neutral position, the motor control valve 38 blocks the fluid lines 54 and 60 so that high pressure fluid cannot be delivered to the wheel motors 20 and fluid cannot be exhausted from the wheel motors 20 back to the reservoir 24. When the crankcase control valve 72 is in a neutral position, it interconnects the fluid line 70 with the fluid line 74 so that fluid is free to flow from either of the fluid lines 54 or 60 through the fluid lines 76 and 74, through the valve 72, and through the fluid lines 70 and 68 to the drive chambers of the wheel motors 20.

If the tractor is driven through the mechanical transmission 18 while the auxiliary hydrostatic transmission is in its neutral condition, the wheel motors 20 will be driven mechanically and will operate as pumps. Depending upon whether the tractor is driven in a forward or reverse direction, the fluid line 54 or the fluid line 60 will be pressurized due to the wheel motors acting as pumps and this pressure will flow across one of the check valves 78, through the fluid lines 76 and 74, through the valve 72, and through the fluid lines 70 and 68 to the drive chambers of the wheel motors 20. The pressure within the drive chambers of the wheel motors will push the pistons into their cylinders so that they contact their drive member for only a short time. As the pressure differential across the pistons is at a very low level damage to the pistons and their associated drive member is avoided. When the wheel motors 20 are acting as pumps, makeup fluid is provided from the reservoir 24 through the fluid lines 86 and 80 and across one of the check valves 84 to either the fluid line 54 or the fluid line 60 depending upon which is pressurized due to the pumping action of the motors 20. In this regard, it should be noted that it is necessary that the reservoir 24 be located at a higher position than the wheel motors 20 so that a small fluid pressure head will ensure sufficient makeup fluid. In the absence of having the reservoir 24 located at a higher elevation than the wheel motors 20, the fluid line 86 could be connected to the fluid line 40 so that the small pressure head created in the fluid line 40 by the restrictor 46 will ensure that sufficient makeup oil is available. However, if pressure in fluid line 40 is relied on for makeup fluid there will be no fluid available if the tractor is being towed with the engine stalled. With this in mind, it is desirable to have the elevated reservoir.

Figure 3:
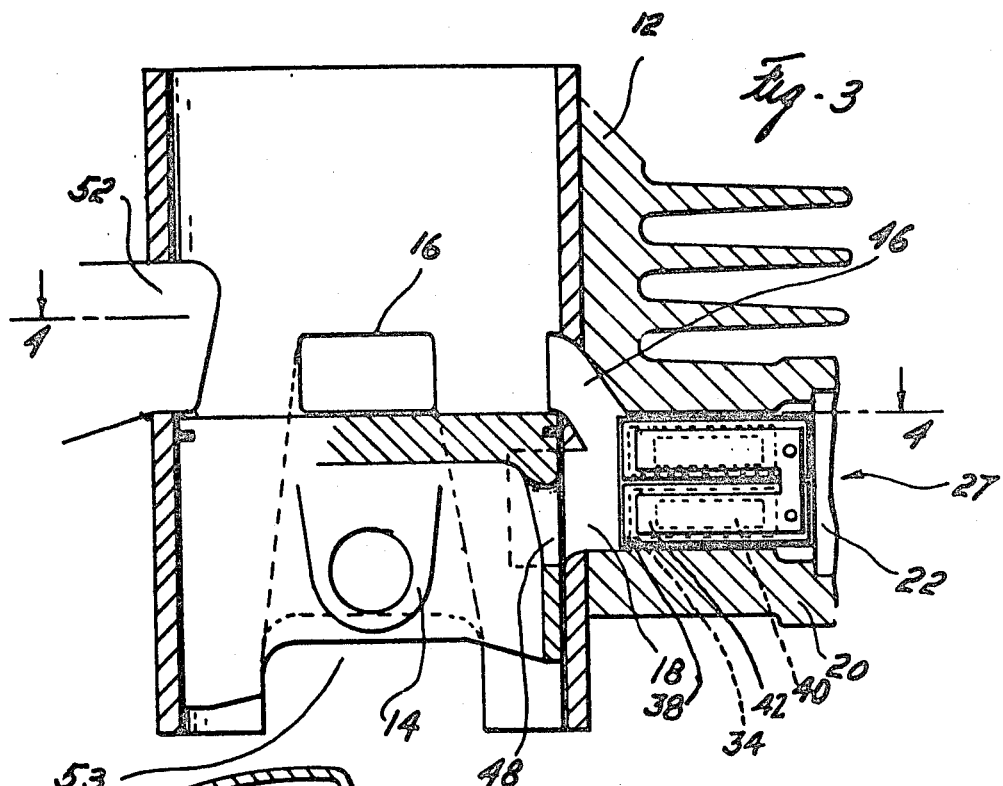
FIG. 3 is a schematic illustration of a portion of the hydrostatic drive system illustrated in FIG. 2 and showing a modification thereof.
Figure 4:
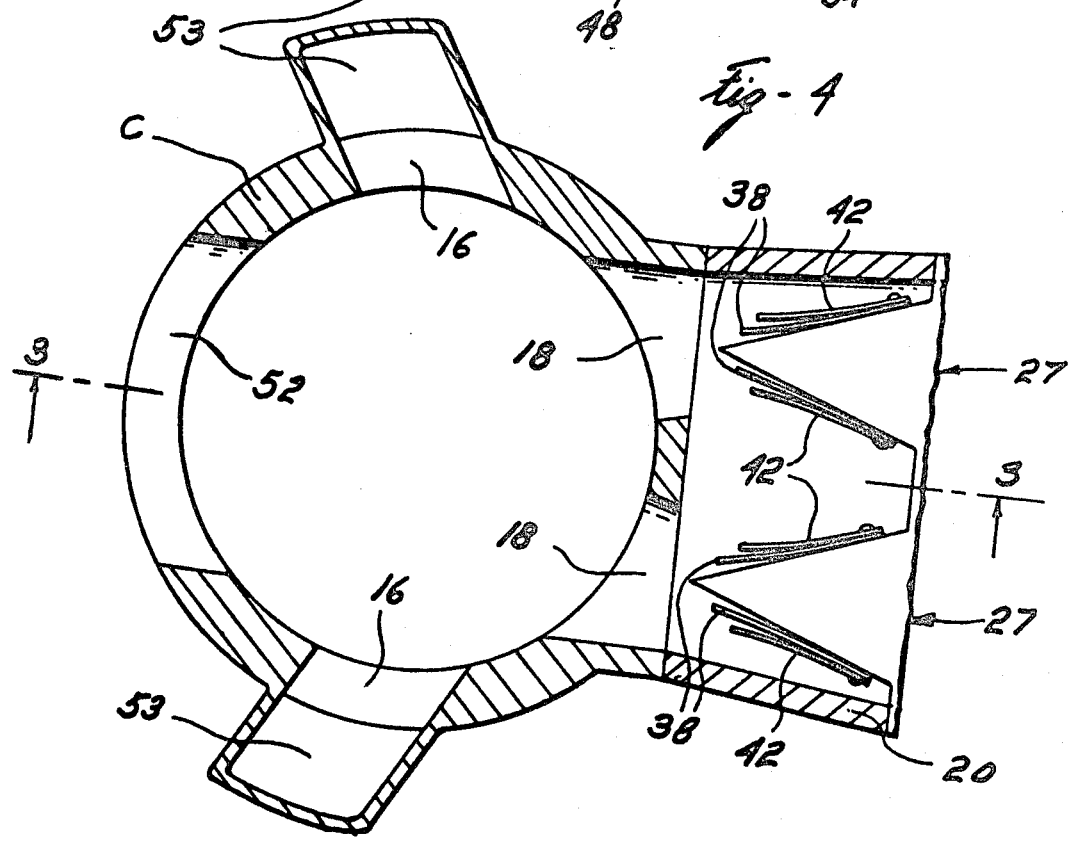
Figure 5:
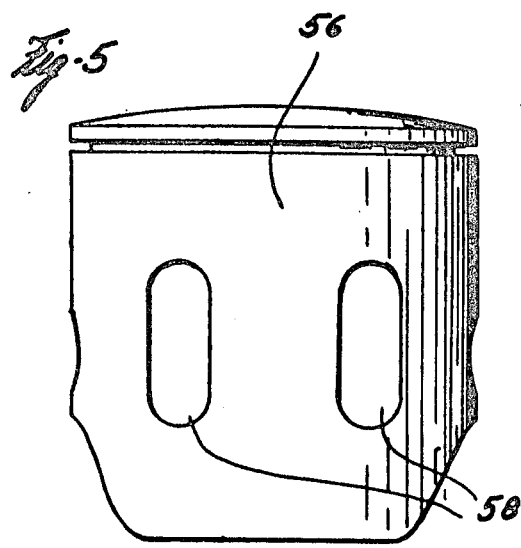
Figure 6A:
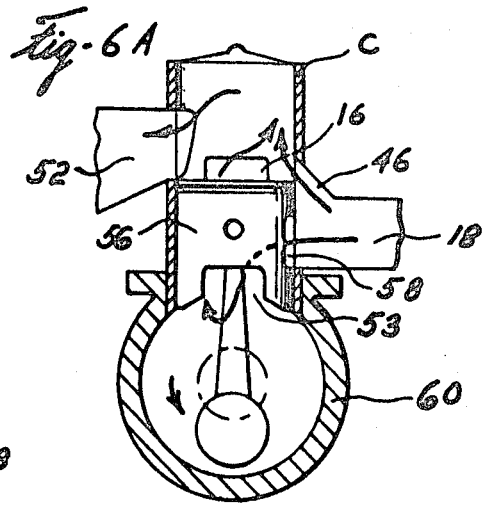
Figure 6B:
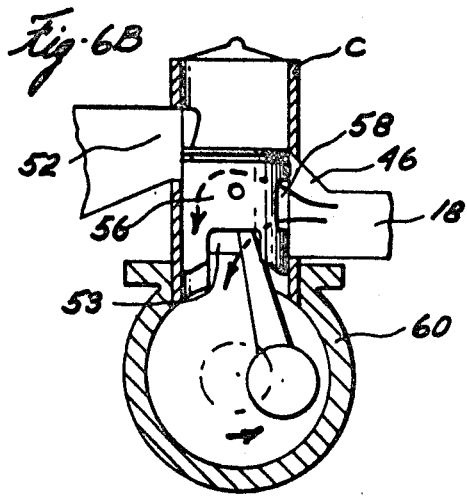
Figure 6C:
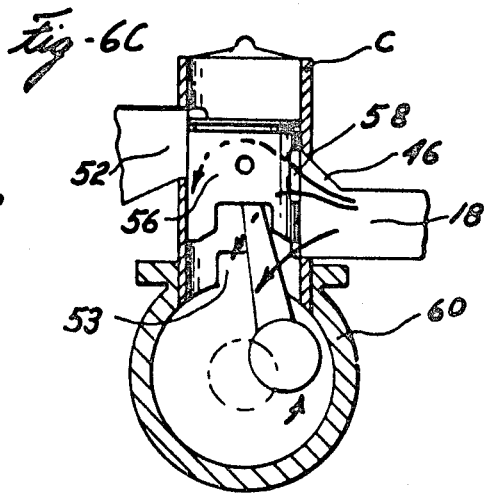
Figure 6D:
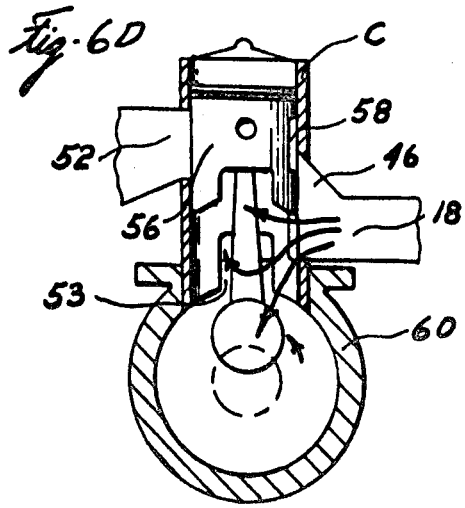
Figure 6E:
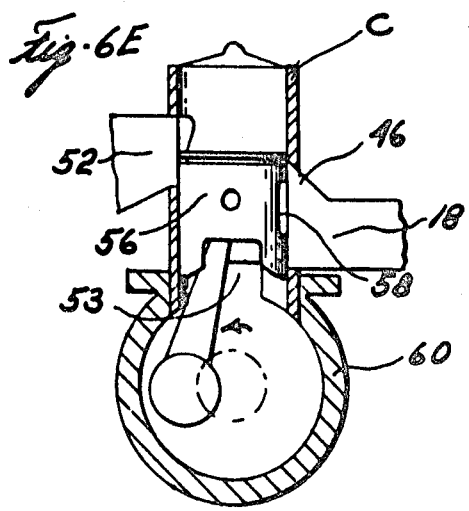
Figure 7:
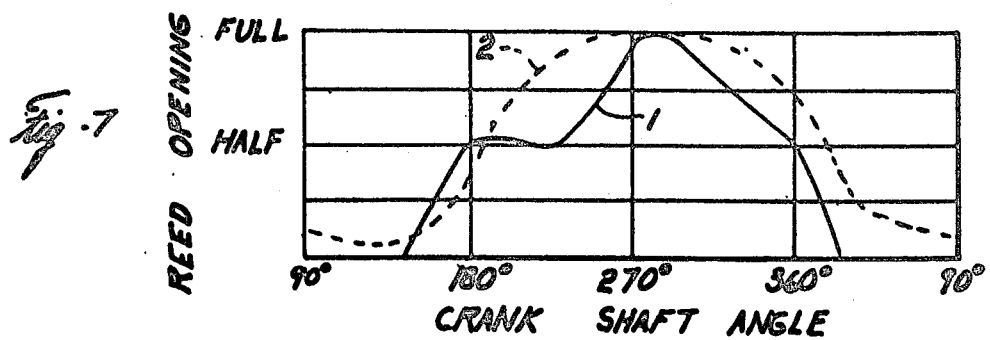
Figure 8:
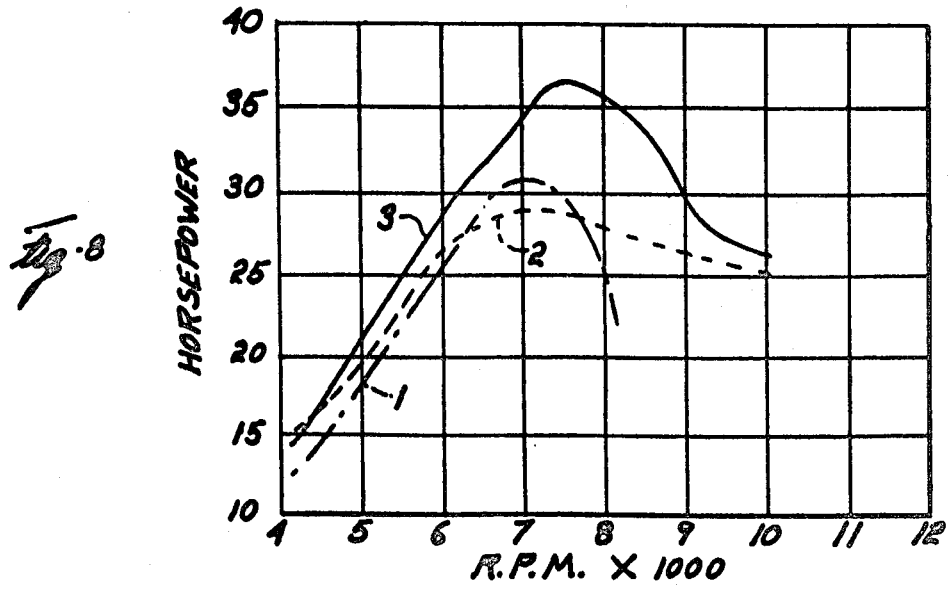
Figure 11:
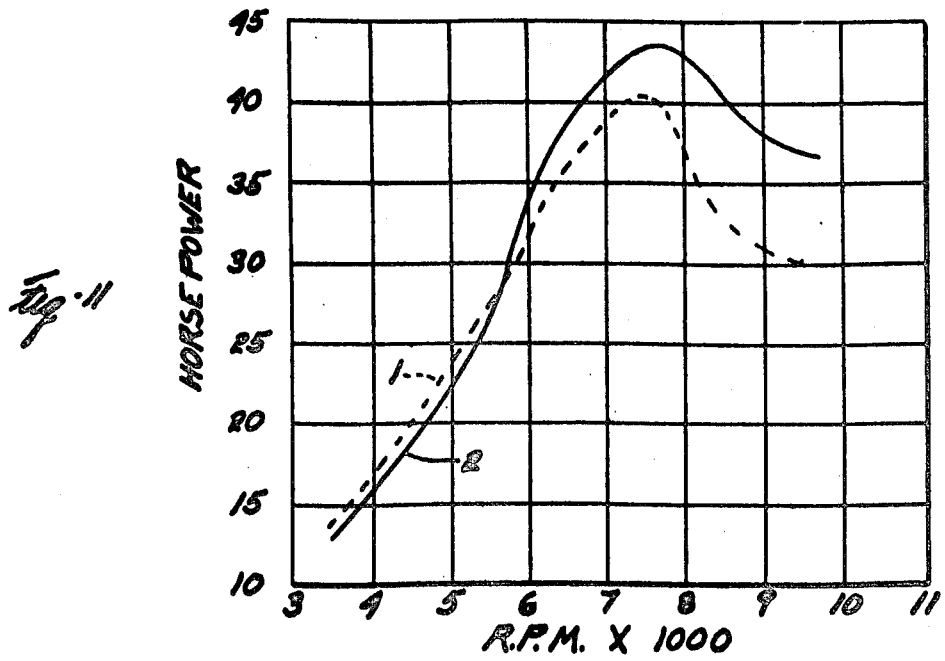
Figure 1:
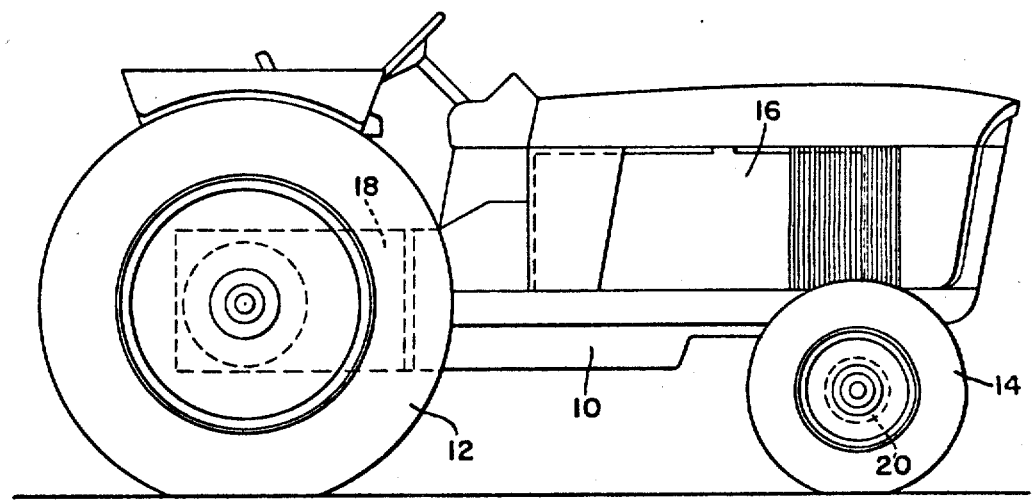
Figure 3:
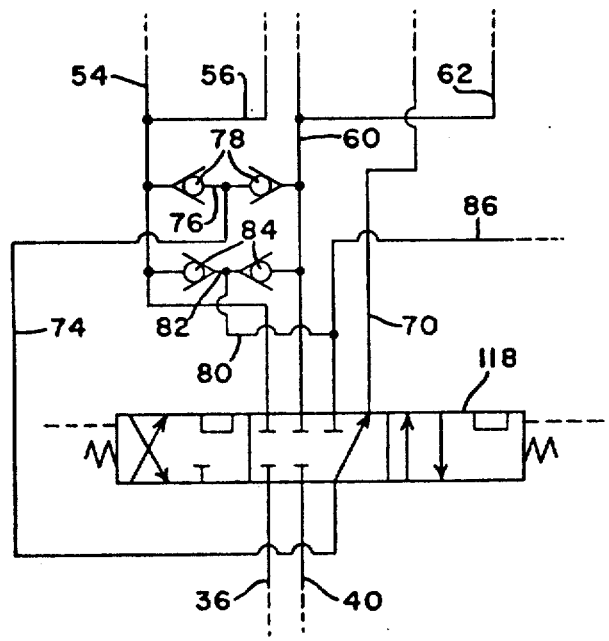
Figure 2:
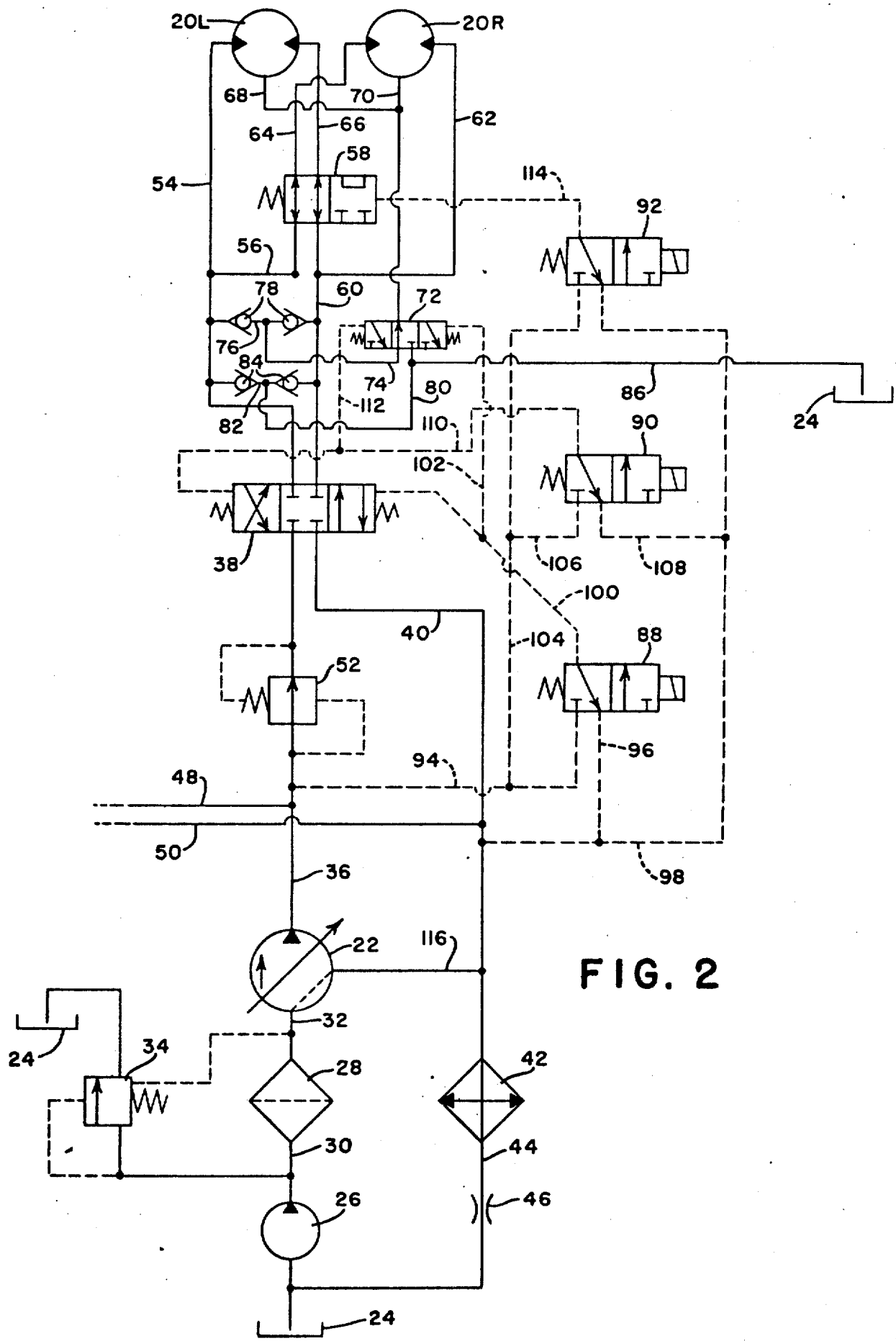

A slightly modified portion of the auxiliary hydrostatic drive system is illustrated in FIG. 3 wherein the motor control valve 38 and valve 72 are combined into a single valve 118. In the FIG. 3 embodiment, the fluid lines 36, 40, and 74 are connected to ports in the first side of the valve 118 while the fluid lines 54, 60, 80, and 70 are connected to ports in the second side of the valve 118. Although the FIG. 3 embodiment has a single valve instead of two valves as employed in the FIG. 2 embodiment, the operation of the FIG. 3 embodiment is exactly the same as the operation of the FIG. 2 embodiment.

Although two embodiments of the invention have been described and illustrated, various modifications can be made without departing from the spirit and scope of the invention. For example, the pilot system for operating the valves 38, 58, and 72 can be omitted and these valves directly actuated by solenoids, or the valves 88 and 90 can be combined into a single valve. Also, the valve 72 could be changed to a two-position valve. Still additional modifications could be made without departing from the underlying principles of the invention, and therefore, the invention should not be limited to the specific illustration and description, but only by the following claims.

We claim:

1. A vehicle having an engine, a pair of main drive wheels, variable ratio transmission means for transmitting driving torque from the engine to the main drive wheels, a pair of steerable wheels, and an auxiliary hydrostatic drive system for the steerable wheels including a fluid pump, a reservoir providing a supply of fluid for the pump, at least one reversible reciprocating piston type motor drivingly connected to the steerable wheels, said motor having first and second ports and a drive chamber port, first fluid line means interconnecting the pump and reservoir with the first and second ports in the motor, and motor control valve means interposed in the first fluid line means movable to either side of a neutral, fluid blocking position to deliver fluid from the pump to either the first or second ports in the motor, characterized in that a second valve has first and second sides, second fluid line means connects the drive chamber port with the first side of the second valve, additional fluid line means interconnects the reservoir, the second side of the three-way valve and the first fluid line means between the motor and motor control valve means, first check valve means are interposed in the additional fluid line means to prevent flow of fluid from the first fluid line means to the additional fluid line means, further fluid line means separate from the additional fluid line means interconnects the first fluid line means between the motor and motor control valve means with the second side of the three-way valve, second check valve means are interposed in the further fluid line means to prevent flow of fluid from the further fluid line means to the first fluid line means, and the three-way valve is movable between a first neutral position in which it interconnects the further fluid line means with the second fluid line means to destroke the motor and at least one additional position in which it interconnects the additional fluid line means with the second fluid line means to vent the drive chamber port to the reservoir.

2. The vehicle as set forth in claim 1 wherein control means operatively interconnect the motor control valve means and the second valve for substantially simultaneous movement from and to their neutral positions.

3. The vehicle as set forth in claim 2 wherein the motor control valve means and second valve are pilot operated and the control means includes a common pilot circuit.

4. The vehicle as set forth in claim 1 wherein the motor control valve means and second valve are constructed as a common valve.

* * * * *

UNITED STATES PATENT OFFICE
CERTIFICATE OF CORRECTION

Patent No. 3,987,768      Dated October 26, 1976

Inventor(s) Billie Gene Hunck et al.      Page 1 of 3

It is certified that error appears in the above-identified patent and that said Letters Patent are hereby corrected as shown below:

Cancel all of the present printed drawings, and insert the two sheets of drawings bearing Patent No. 3,987,768, as shown on the attached sheets.

Signed and Sealed this

Twenty-fifth Day of January 1977

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,987,768              Dated 26 October 1976

Inventor(s) Billie Gene Hunck et al

It is certified that error appears in the above-identified patent and that said Letters Patent are hereby corrected as shown below:

Column 6, line 27, change "three-way" to --second--; line 35, change "three-way" to --second--; and line 39, change "three-way" to --second--.

Signed and Sealed this

Twenty-sixth Day of April 1977

[SEAL]

Attest:

RUTH C. MASON
*Attesting Officer*

C. MARSHALL DANN
*Commissioner of Patents and Trademarks*